Dec. 15, 1959 R. M. HELLER 2,916,765
MACHINE FOR APPLYING A SEALANT TO ARTICLES
Filed May 2, 1955
FIG.1.
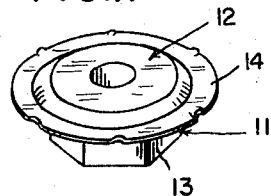
FIG.2.
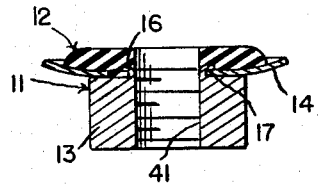
FIG.3.
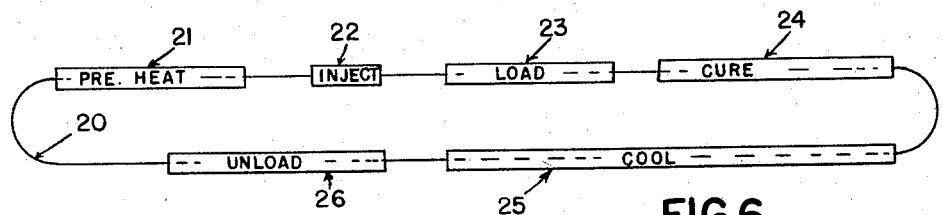
FIG.4.
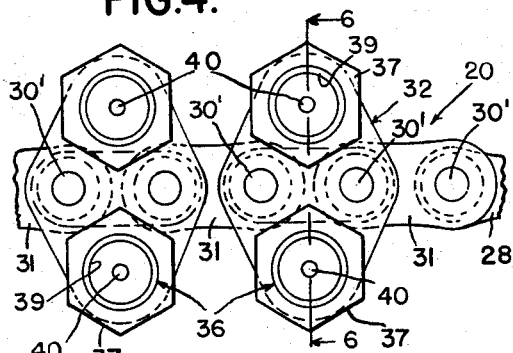
FIG.6.
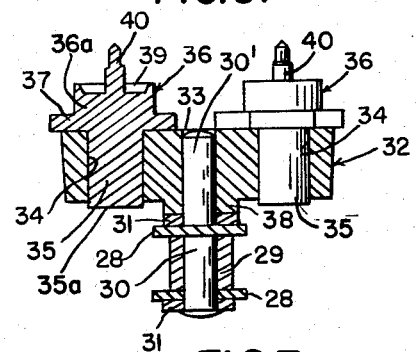
FIG.5.
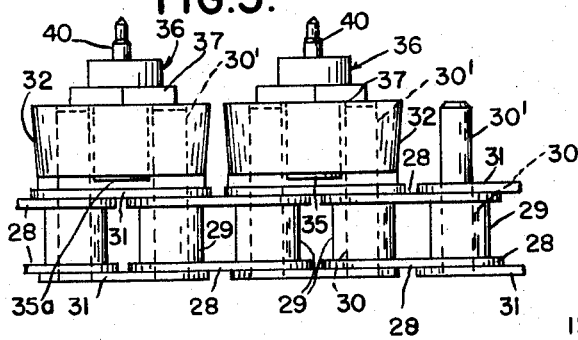
FIG.7.
FIG.8.
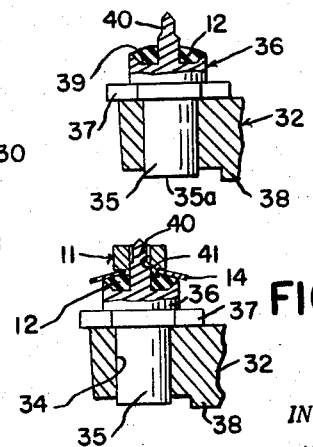
INVENTOR.
ROBERT M. HELLER
BY Whittemore, Hulbert &
Belknap ATTORNEYS

United States Patent Office 2,916,765
Patented Dec. 15, 1959

2,916,765

MACHINE FOR APPLYING A SEALANT TO ARTICLES

Robert M. Heller, Birmingham, Mich., assignor to Watts Electric & Mfg. Co., Oakland, Mich., a corporation of Michigan Application May 2, 1955, Serial No. 505,286

4 Claims. (Cl. 18—4)

The present invention relates to an improved apparatus for manufacturing composite articles, as by molding and applying to a relatively rigid body member a sealant or other compressible member of moldable material. The finished product may take many different forms and may have many different functions. Simply as a typical illustration, the principle of the invention is shown herein as applied in the production of a threaded nut having an annular grommet or washer of a resiliently deformable material bonded thereto. However, the apparatus is widely applicable to the production of composite articles of this general type, usually annular in outline, without regard to the exact structure and properties of the components thereof.

It is an object of the invention to provide apparatus comprising a multiplicity of like mold holders mounted for travel in a series, each holder removably supporting one or more open molds in which an exactly metered charge of a desired moldable material, powdered fluid or plastic is deposited as the molds are continuously carried by the holders in a straight line succession. With a proper charge of a moldable material in the respective mold cavities, a relatively rigid base member of the composite article is next placed in engagement with the metered material. It is exactly guided as this is done by physically registering the member in reference to the individual mold and its mold cavity, preferably by a telescoping engagement of the rigid member with a projecting register pin of the mold. The molds may then be subjected to a curing treatment, by which the moldable material is set in a permanently bonded relation to the body member.

It is a further object of the invention to provide an apparatus of the above description, in which the mold holders are mounted on a conveyor for ready and rapid replacement, as determined by the nature and size of the articles being produced and in which the molds themselves are similarly adapted for easy, rapid mounting on and dismounting from the mold holders. This permits a great variety of articles to be produced by a simple apparatus performing a continuous molding procedure at a relatively rapid output rate.

As a further object it is contemplated that all molds, regardless of the particular character of the object molded therein, shall have a base portion of a standard shape and size mounting the same for quick removal and replacement on or in a correspondingly shaped receiver formation or aperture of the mold holder, the holder then presenting the mold cavity of a mold placed thereon in an upwardly opening disposition to receive a metered charge.

A still further object is to provide an apparatus in which the mold conveyor moves at a steady rate of speed and in an endless horizontal orbit; and in which, according to a typical adaptation of the method, the molds are subjected sequentially and without slowing their rate of travel to a preheating treatment to condition them for the reception of the selected moldable material, to an injection step in which the material is accurately metered into the mold cavities in the exact amount required for the finished product, to an assembling operation in which the base members or like rigid pieces are accurately registered with and deposited on the material in the mold cavity, to whatever curing phases the nature of the moldable material requires to cause it to set and bond to the base member or piece, and to a final unloading operation in which the finished product is removed from the mold.

Generally considered, it is an object of the invention to provide improved apparatus concepts of the foregoing character in which it is possible to convert or change over in a negligible space of time for the manufacture of widely different types of articles.

The foregoing as well as other objects will be made more apparent as this description proceeds, especially when considered in connection with the accompanying drawings, wherein:

Fig. 1 is a perspective view of a composite article produced by my apparatus;

Fig. 2 is a vertical sectional view through the composite article in Fig. 1;

Fig. 3 is a schematic plan view of the endless conveyor and stations through which the conveyor passes;

Fig. 4 is a fragmentary top plan view of the endless conveyor and removable mold holders and molds carried thereby;

Fig. 5 is a fragmentary elevational view of the structure in Fig. 4;

Fig. 6 is a vertical sectional view taken substantially on the line 6—6 of Fig. 4;

Fig. 7 is a fragmentary vertical sectional view through a mold holder, mold, and moldable material in the mold; and Fig. 8 is a fragmentary vertical sectional view through a mold holder, mold, separate body, and molded material between the mold and body.

Figs. 1 and 2 of the drawings illustrate structural features of a typical composite article which may be produced at high speed and in excellent quality by my improved apparatus. Regardless of its particular features, any such article will include a body 11 of metal or other relatively rigid material, and a resilient member or sealant 12 of a suitable moldable material. In the particular embodiment in Figs. 1 and 2, the body 11 comprises a conventional interiorly threaded nut 13 and a centrally apertured slightly cupped backing disk 14 rigidly secured coaxially thereto. The resilient member or sealant 12 is coaxial with and bonded to the body 11.

Many alternative composite articles may be manufactured with equal quality, practicality and economy in accordance with the invention; however the built-up article in Figs. 1 and 2 serves as one illustration. Even in this particular selection the nut 13 may be machined or cast or may be a speed nut of shaped sheet metal. The resilient member or sealant 12 is annular in configuration.

The annular backing disk 14 and the nut 13 constituting the body 11 are interlocked rigidly with one another, by upsetting and crimping a small integral end collar 16 of the nut 13 (Fig. 2) outwardly into overlapping clamping engagement with an annular series of internal prongs 17 of the disk 14. This permits the spaces between the prongs 17 to act as bonding openings into which the moldable material of the resilient member 12 may flow to improve the bond between the resilient member 12 and the body 11. However, in any instance in which the body 11 is fabricated of two or more parts, they may be secured together as a unit in any suitable way, as by welding, soldering, etc.

Reference should be had to schematic Fig. 3 wherein the apparatus comprises an endless conveyor 20 which travels at a steady speed in a horizontal plane and in a continuous elongated oval orbit and which may be driven by any suitable means (not shown) under any suitable speed control equipment (not shown), the particular nature of which constitutes no part of the present invention. A succession of material handling and operating stations are spaced along conveyor 20. They may comprise, in the order in which they have effect, a preheating station or chamber 21 in which the uncharged molds are preheated to the proper temperature to receive the moldable material; an injection or depositing station 22 at which an accurately metered amount of a moldable material such as a known plastic, rubber composition, or the like, is charged or otherwise deposited while in a fluid, a powdered or a plastic condition in the molds on the conveyor 20; a loading station 23 at which the separate bodies 11 are accurately registered and engaged with the metered charge of moldable material; a curing station 24 in which the moldable material may be converted, cured or otherwise caused to set and will be permanently bonded to the bodies 11; a cooling station or chamber 25 in which the bonded members 11 and 12 are cooled; and finally an unloading station 26 at which the completed cooled composite articles are unloaded from conveyor 20 while the latter continues its travel in a subsequent identical cycle of operations.

The material injection or depositing operation performed at 22 may be accomplished by any suitable means (not shown), however it is important that it be exact and accurate as to quantity and timing in reference to the advancing molds. Likewise the body loading operation at 23, the curing and cooling operations at 24 and 25 respectively, and the article unloading operation at 26 may be performed by any suitable equipment or means, automatic or otherwise, so long as coordination with the mold travel is observed. The preheating, curing and cooling operations should be sufficient to accomplish the desired results with a moldable material of the type mentioned.

Referring now particularly to Figs. 4, 5 and 6, the conveyor is a conventional chain type comprising upper and lower sets of longitudinally spaced main links 28. The links 28 of one set are in vertical registration with the links 28 of the other set. Spacers 29 are between the upper and lower links 28 at opposite ends thereof, and upper and lower sets of longitudinally spaced connecting or coupling links 31 span the spaces between and have end portions engaging adjacent end portions of the links 28. Pivot pins 30 extend through the spacers 29 and connect the engaging end portions of said connecting links 31 to the upper and lower main links 28.

The pins 30 have upstanding portions 30' that extend above the uppermost connecting links 31 and thereby provide locating posts at opposite ends of the uppermost links 31 on which individual transversely extending mold holders 32 are removably mounted. The center portion of each holder 32 is substantially equal in width to a link 31 and is sleeved upon a pair of the upstanding portions 30' of the pins 30. The conveyor will be appropriately guided in its horizontal orbit by suitable sprockets and the like (not shown) and will be driven by suitable mechanism (also not shown). Such guiding and driving means form no part of the present invention.

Each of the mold holders 32 is formed of a light weight material, and is preferably an aluminum casting. Though its configuration may vary widely, each holder 32 is an elongated member and is substantially oval shaped in plan so that necessary clearance is provided between adjacent holders when they pass around the guiding or driving sprockets (not shown) at opposite ends of the longitudinal reaches of the conveyor.

Each holder 32 has a pair of transversely spaced vertical openings 33 which receive the upstanding portions 30' of the pins 30 to enable each holder to be quickly and easily assembled with or disassembled from the conveyor 20. As viewed in Fig. 4, the openings 32 are aligned along the minor axis of the holder 32, i.e. along the longitudinal path of travel of conveyor 20.

Each holder 32 also has on its major axis a pair of longitudinally spaced vertical openings 34, and each of said openings 34 has a diameter of sufficient size to receive with a freely sliding clearance a mating downwardly projecting cylindrical portion 35 of an individual mold 36, so that such molds 36 can be quickly assembled with or disassembled from the mold carriers.

For lightness in weight, each mold 36 is a die casting of aluminum. Preferably the body 36a of each mold is provided at the upper end of the downwardly projecting cylindrical portion 35 with a laterally extending horizontal flange 37 which rests on the upper surface of a holder 32. As shown, the axial length of the cylindrical portion 35 is slightly greater than the thickness of a holder 32 so that the lower projecting end portion 35a of the portion 35 may be engaged by a tool (not shown) when it is desired to eject upwardly the portion 35 from an opening 34. Preferably each holder 32 has on the bottom thereof a downwardly projecting boss 38 that rests upon the upper surface of an upper coupling link 31 and maintains the holder 32 in spaced relation to the conveyor 20.

The body 36a of each mold is provided above the horizontal flange 37 with an upwardly opening annular mold cavity 39 surrounding and concentric with an upstanding centrally located integral pilot pin 40 that is engageable with the threaded bore 41 of the nut 13 of the separate body 11. Sufficient clearance is provided between the pin 40 and bore 41 to permit the nut 13 to be sleeved quickly upon the pin. Thus the separate body 11 can be placed accurately in registration with the material in the mold cavity 39.

In use the conveyor 20 is first equipped with a complete set of mold holders 32, and each mold holder 32 is equipped with its complement of two molds 36. Then the conveyor 20 is actuated to transport the molds 36 into the preheat station or chamber 21 where the molds 36 are preheated to the proper temperature to receive a charge of moldable material. Then the molds 36 pass to the mold injection or filling station 22 where suitable means (not shown) deposits, by injection or otherwise, into each of the upwardly opening mold cavities 39 an exactly metered amount of moldable material 15 to form the sealant 12, as shown in Fig. 7.

Upon arrival of the charged molds 36 at the loading station, a body 11 is sleeved upside down upon the pilot pin 40 of each mold 36, as illustrated in Fig. 8. Thus each body 11 is placed accurately in registration with the mold cavity 39 and in engagement with the moldable material in the cavity. The moldable material 15 in the cavity 39 will then engage and adhere to the concave surface of the disk 14 of the body and to the collar 16 of the nut 13 of the body and will flow between the prongs 17 of the disk 14 to engage and adhere to the nut 13.

Then the molds 36 pass through curing station or chamber 24 where the moldable material 15 in each cavity 39 is cured and set in permanently bonded relation with the body 11 with which it is engaged. Such molds 36 then pass through a cooling station or chamber 25, and arrive finally at unloading station 26 where the completed composite articles are removed from the molds 36. The conveyor 20 is constantly in motion while the molds 36 pass from the first to the last station, as described. The completed composite articles may be stripped from the molds 36 by exerting a force against the disks 14. If desired, the molds 36 may be removed from the holders 32 by exerting a force against the exposed lower ends 35a of the base portions 35.

The composite articles are produced in complete uniformity and high quality, and at a rapid rate of production. The moldable material 15 will usually be in a fluid or plasticized condition, however it is contemplated that other materials in powdered and solid condition susceptible of an exact deposition may be employed. Any suitable thermoplastic material may be used, however the nature of the material will of course also determine the necessity and character of the preheating and curing treatment to which it is subjected.

What I claim as my invention is:

1. Apparatus for making molded articles, comprising an endless conveyor of the pivotally connected link type movable in a horizontal orbit and provided with longitudinally spaced vertical cylindrical elements having lower portions thereof constituting pivots for the links of said conveyor and having upper portions thereof above the links of said conveyor and constituting upstanding locating posts having free upper ends, and separate interchangeable removable mold holders above and spaced apart longitudinally of said conveyor, each of said mold holders having two laterally spaced vertical openings freely slidably receiving two adjacent locating posts, the spacing of the vertical openings in said mold holders being uniform and the same as the longitudinal spacing of said locating posts, whereby any one mold holder may be detachably interlocked with any two adjacent locating posts when slid downwardly upon the free upper ends thereof, each mold holder being held against horizontal turning movement relative to said conveyor by the engagement of the two vertical openings therein with said two adjacent locating posts, each mold holder having a plurality of mold support means thereon spaced laterally from a line joining said vertical openings, molds removably carried by said mold support means, and each mold holder being quickly removable from said conveyor when slid upwardly from the free upper ends of said two adjacent locating posts.

2. Apparatus for making molded articles, comprising an endless conveyor movable in a horizontal orbit including links, pivot means connecting said links and provided with longitudinally spaced upstanding locating posts having free upper ends, separate individually removable mold holders above and spaced apart longitudinally of said conveyor, each of said mold holders having two laterally spaced downwardly opening vertical openings freely slidably receiving two adjacent locating posts and detachably retaining said mold holders against horizontal turning movement relative to said conveyor, each of said mold holders being also provided in laterally spaced relation to a line joining the two downwardly opening vertical openings aforesaid with a plurality of upwardly opening vertical openings for slidably receiving portions of separate individually removable molds, said mold holders being quickly assembled with said conveyor by being slid downwardly upon the free upper ends of said locating posts, and being quickly disassembled from said conveyor by being slid upwardly from the free upper ends of said locating posts.

3. Apparatus for making molded articles, comprising an endless conveyor movable in a horizontal orbit including links, pivot means connecting said links and provided with longitudinally spaced vertically extending anchorage means for separate individually removable mold holders, and separate individual removable mold holders above and spaced apart longitudinally of said conveyor, each of said mold holders having vertically extending anchoring means freely slidably engaging two adjacent vertically extending anchorage means and detachably retaining said mold holders against horizontal turning movement relative to said conveyor, and each of said mold holders being provided in laterally spaced relation to a line joining the vertically extending anchoring means aforesaid with vertically extending means for telescopically engaging vertically extending portions of a plurality of separate individually removable molds, said mold holders being quickly assembled with and disassembled from said conveyor by sliding said vertically extending anchoring means relative to said vertically extending anchorage means.

4. Apparatus for making molded articles comprising an endless link type conveyor movable in a horizontal orbit and provided at equal intervals with vertical pivot means, said pivot means, said pivot means having vertical anchorage means thereon for mold holders, separate removable mold holders carried by said conveyor, each of said mold holders having a pair of vertical anchoring means thereon releasably engaging two adjacent anchorage means on said conveyor and retained thereby against horizontal turning movement relative to said conveyor, each of said mold holders being provided in laterally spaced relation to a line joining said anchoring means with support means for releasably engaging a plurality of separate individually removable molds, and molds carried by said support means.

References Cited in the file of this patent

UNITED STATES PATENTS

| Number | Name | Date |
|---|---|---|
| 1,097,017 | Hadfield | May 19, 1914 |
| 1,616,076 | Cotton | Feb. 1, 1927 |
| 1,867,132 | Berenstein | July 12, 1932 |
| 1,917,929 | Duffy | July 11, 1933 |
| 1,948,344 | Fischer | Feb. 20, 1934 |
| 1,959,894 | Bartusch | May 22, 1934 |
| 2,103,860 | Mazzeo | Dec. 28, 1937 |
| 2,342,920 | Clark | Feb. 29, 1944 |
| 2,347,117 | Luxenberger et al. | Apr. 18, 1944 |
| 2,377,536 | Wisner | June 5, 1945 |
| 2,428,878 | Johnson | Oct. 14, 1947 |
| 2,431,393 | Franklin | Nov. 25, 1947 |
| 2,502,860 | Leithiser | Apr. 4, 1950 |
| 2,507,753 | Blackhurst | May 16, 1950 |
| 2,663,908 | Maier et al. | Dec. 29, 1953 |
| 2,733,478 | Schwieger | Feb. 7, 1956 |
| 2,754,546 | Mason et al. | July 17, 1956 |
| 2,790,206 | Cofek | Apr. 30, 1957 |

UNITED STATES PATENT OFFICE

CERTIFICATE OF CORRECTION

Patent No. 2,916,765 December 15, 1959

Robert M. Heller

It is hereby certified that error appears in the above numbered patent requiring corretion and that the said Letters Patent should read as corrected below.

In the grant, lines 2 and 3, for "assignor to Watts Electric & Mfg. Co., of Oakland, Michigan, a corporation of Michigan," read -- assignor to Watts Electric & Mfg. Co., of Birmingham, Michigan, a corporation of Michigan, --; in the heading to the printed specification, lines 4 to 6, for "assignor to Watts Electric & Mfg. Co., Oakland, Mich., a corporation of Michigan" read -- assignor to Watts Electric & Mfg. Co., Birmingham, Mich., a corporation of Michigan --.

Signed and sealed this 17th day of May 1960.

(SEAL)

Attest:

KARL H. AXLINE
Attesting Officer

ROBERT C. WATSON
Commissioner of Patents